(12) United States Patent
Fukuda et al.

(10) Patent No.: US 6,847,518 B2
(45) Date of Patent: Jan. 25, 2005

(54) MEMBRANE ELECTRODE ASSEMBLY FOR POLYMER ELECTROLYTE FUEL CELL

(75) Inventors: Kaoru Fukuda, Wako (JP); Masaki Tani, Wako (JP); Hayato Kaji, Wako (JP); Shigeru Inai, Wako (JP); Takeshi Muro, Wako (JP); Shinya Watanabe, Wako (JP); Tomoyuki Tada, Hiratsuka (JP); Masahiko Inoue, Hiratsuka (JP)

(73) Assignees: Honda Motor Co., Ltd., Tokyo (JP); Tanaka Kikinzoku Kogyo K.K., Tokyo (JP)

( * ) Notice: Subject to any disclaimer, the term of this patent is extended or adjusted under 35 U.S.C. 154(b) by 0 days.

(21) Appl. No.: 10/725,331

(22) Filed: Dec. 2, 2003

(65) Prior Publication Data

US 2004/0136143 A1 Jul. 15, 2004

(30) Foreign Application Priority Data

Dec. 4, 2002 (JP) ........................................ 2002-353005

(51) Int. Cl.$^7$ ................................................. H01G 9/04
(52) U.S. Cl. ....................... 361/508; 361/516; 361/532; 429/13

(58) Field of Search .................................. 361/508–509, 361/512, 516, 528–530, 532; 429/13, 14, 17

(56) References Cited

U.S. PATENT DOCUMENTS

| | | | | |
|---|---|---|---|---|
| 3,846,344 A | * | 11/1974 | Larson et al. | ................ 502/301 |
| 6,183,898 B1 | * | 2/2001 | Koschany et al. | ............ 429/42 |
| 6,309,769 B1 | | 10/2001 | Haug | .......................... 429/13 |
| 2003/0175570 A1 | | 9/2003 | Gao et al. | |

FOREIGN PATENT DOCUMENTS

| | | |
|---|---|---|
| JP | 11-250918 | 9/1999 |
| JP | 2000-243404 | 9/2000 |

* cited by examiner

*Primary Examiner*—Anthony Dinkins
(74) *Attorney, Agent, or Firm*—Arent Fox PLLC

(57) ABSTRACT

A membrane electrode assembly for a polymer electrolyte fuel cell has a polymer electrolyte membrane, an anode, and a cathode having a catalytic layer and a diffusion layer. The alloy catalyst contains ruthenium in the anode diffusion layer. The assembly has less loss of efficiency, particularly when operated at high potentials.

3 Claims, 2 Drawing Sheets

MEMBRANE ELECTRODE ASSEMBLY FOR POLYMER ELECTROLYTE FUEL CELL

BACKGROUND OF INVENTION

1. Technical Field

The present invention relates to membrane electrode assemblies for polymer electrolyte fuel cells, and in particular, relates to a technology which can reduce leaching of a catalyst material at the anode side during operation at high potential.

2. Background Art

A polymer electrolyte fuel cell (hereinafter simply referred to as a "fuel cell") is formed by laminating separators at both sides of a flat electrode structure. The electrode structure is a stacked element having a polymer electrolyte membrane held between a positive side electrode catalyst layer and a negative side electrode catalyst layer, with a gas diffusion layer laminated outside of each electrode catalytic layer. In such a fuel cell, for example, when hydrogen gas is supplied in a gas passage of the separator disposed at the negative electrode side, and an oxidizing gas is supplied in a gas passage of the separator disposed at the positive electrode side, an electrochemical reaction occurs, generating an electric current. During operation of the fuel cell, the gas diffusion layer transmits the electrons generated by the electrochemical reaction between the electrode catalytic layer and the separator, and diffuses the fuel gas and the oxidizing gas at the same time. The negative side electrode catalytic layer induces a chemical reaction in the fuel gas to generate protons ($H^+$) and electrons, and the positive side electrode catalytic layer generates water from oxygen, protons, and electrons, and the electrolyte membrane transmits protons by ionic conduction. As a result, electric power is provided from the positive and negative electrode catalytic layers.

As an electrode catalytic layer, a mixture of carbon particles carrying a catalyst material such as a rare metal and an electrolyte consisting of an ion conducting polymer, is well known. Platinum (hereinafter simply referred to as "Pt") alone, or Pt with other metals, is known as a catalyst material (see Japanese Unexamined Patent Application Publication No. 2000-243404). In particular, a platinum-ruthenium (hereinafter simply referred to as "Pt—Ru") alloy is used in a fuel electrode (anode) to prevent the Pt from being poisoned by impurities such as carbon monoxide contained in the hydrogen gas which is used as a fuel gas (see Japanese Unexamined Patent Application Publication No. 11-250918).

However, during operation of the fuel cell, particularly during operation at high potential, Ru in the anode may be eluted and precipitated, and gas diffusion properties may be deteriorated thereby.

SUMMARY OF THE INVENTION

Therefore, an object of the present invention is to provide a membrane electrode assembly for a polymer electrolyte fuel cell which can reduce deposition of the Ru component in the anode diffusion layer and deterioration of power generating efficiency of the fuel cell, even in operation at high potential.

The membrane electrode assembly for a polymer electrolyte fuel cell of the present invention has a membrane electrode assembly for a polymer electrolyte fuel cell having a polymer electrolyte membrane, a cathode, and an anode having a catalytic layer and a diffusion layer, and an alloy catalyst containing Ru is added to the anode diffusion layer.

According to the present invention, by adding the alloy catalyst containing Ru to the anode diffusion layer, Ru contained in this added alloy catalyst acts as a core, and the Ru component which is eluted from the anode catalytic layer is deposited around the core and is trapped. As a result, deposition of the Ru component in a gas passage of the anode diffusion layer can be prevented, and deterioration of power generating efficiency due to the deposition of the Ru component during the operation at high potential can also be reduced.

Furthermore, in the present invention, it is desirable that the alloy catalyst containing Ru be supported by carbon particles. It is also desirable that the catalyst supporting carbon particles be used mixed with a water-repellent resin, and that the weight ratio of the water-repellent resin and the catalyst supporting carbon particles be in a range from 1:9 to 7:3. FIG. 3 is a graph showing the relationship of the weight of water-repellent resin to the weight of catalyst supporting carbon particles and degree of decrease in voltage. As is clear from FIG. 3, in the case in which the weight ratio of the water-repellent resin and the catalyst supporting carbon particles is in a range from 1:9 to 7:3, the Ru component which is eluted from the anode catalytic layer can be deposited on Ru of the carbon particles added to the anode diffusion layer. As a result, deterioration of voltage can be reduced to be not more than 50 mV, and superior effect in minimizing efficiency loss can be exhibited.

Furthermore, in the present invention, it is desirable that the absorbed amount of water in the carbon particles under a saturated water vapor pressure at 60° C. be not less than 150 cc/g. The Ru component eluted from the anode catalytic layer is ionized and is in humidifying water which is in the anode, and the Ru component migrates to the anode diffusion layer with the discharge of this humidifying water. Therefore, the Ru ion in this water is required to be deposited efficiently on the Ru which is contained in the catalyst supporting carbon particles. FIG. 4 is a graph showing a relationship of the absorbed amount of water and the degree to which voltage is reduced. As is clear from FIG. 4, in the case in which the absorbed amount of water is not less than 150 cc/g, the Ru component which is eluted from the anode catalytic layer can be deposited around the Ru which is contained in the carbon particles added to the anode diffusion layer. As a result, reduction in voltage can be reduced to be not more than 50 mV, and superior reducing effect in minimizing efficiency loss can be exhibited.

EXAMPLE

Figure 1:
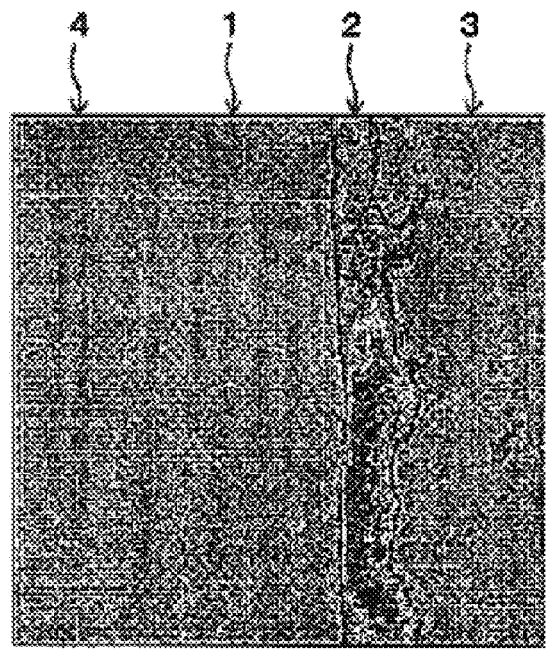
FIG. 1 is a photograph showing Ru around a cross section of the membrane electrode assembly in an Example of the present invention.

The present invention is further explained by way of Example.

1. Preparation of Membrane Electrode Assembly

Sample 1

35 g of ion conductive polymer (trade name: NafionSE20192, produced by Du Pont), 10 g of platinum supporting carbon particles (trade name: TEC10E50E, produced by TANAKA PRECIOUS METALS) in which the weight ratio of carbon black to platinum was 50:50, and 2.5 g of crystalline carbon fiber (trade name: VGCF, produced by SHOWA DENKO K. K.) were mixed to prepare cathode catalyst paste. This cathode catalyst paste was coated on an FEP sheet at 0.3 mg/cm$^2$ by the amount of Pt and was dried to prepare a cathode electrode (catalytic layer) sheet. On the other hand, 36.8 g of ion conductive polymer (trade name: NafionSE20192, produced by Du Pont), 10 g of Pt—Ru supporting carbon particles (trade name: TEC61E54, Pt:Ru=1:1, produced by TANAKA PRECIOUS METALS) in which the weight ratio of carbon black to catalyst was 46:54 were mixed to prepare anode catalyst paste. This anode catalyst paste was coated on an FEP sheet at 0.15 mg/cm$^2$ by the amount of the catalyst and was dried to prepare an anode electrode (catalytic layer) sheet.

3 g of teflon (trademark) powder (trade name: L170J, produced by ASAHI GLASS Co., Ltd.) and 58.7 g of Pt—Ru supporting carbon particles (trade name: TEC61E54, Pt:Ru=1:1, catalyst supporting material: Ketchenblack EC, produced by TANAKA PRECIOUS METALS) were mixed with ethylene glycol to prepare an undercoating layer paste A1. 12 g of teflon (trade mark) powder (trade name: L170J, produced by ASAHI GLASS Co., Ltd.) and carbon black powder (trade name: VulcanXC75, produced by Cabot Corporation), were mixed with ethylene glycol to prepare an undercoating layer paste B1. The undercoating layer paste A1 was coated on a carbon paper (trade name: TGP060, produced by TORAY Industries) which was processed to be water repellent beforehand so as to have a thickness of 2.3 mg/cm$^2$ and was dried, thereby preparing an anode diffusion layer. On the other hand, the undercoating layer paste B1 was coated on the same carbon paper as the anode so as to have a thickness of 2.3 mg/cm$^2$ and dried, to prepare cathode diffusion layer.

The electrode sheets of the anode and the cathode were transferred to an electrolyte membrane by a decal method (unification pressure: 40 kg/cm$^2$) to prepare a membrane-electrode complex CCM, and the anode and the cathode diffusion layers were laminated on both surfaces of this CCM to prepare membrane electrode assembly MEA of Sample 1.

Sample 2

Using the producing process of the anode diffusion layer of Sample 1, except that undercoating layer paste A2 was used instead of the undercoating layer paste A1, the membrane electrode assembly MEA of Sample 2 was prepared in the same way as in Sample 1. The undercoating layer paste A2 was prepared by mixing 9 g of teflon (trademark) powder (trade name: L170J, produced by ASAHI GLASS Co., Ltd.) and 45.6 g of Pt—Ru supporting carbon particles (trade name: TEC61E54, Pt:Ru=1:1, catalyst supporting material: Ketchenblack EC, produced by TANAKA PRECIOUS METALS) with ethylene glycol.

Sample 3

Using the producing process of the anode diffusion layer of Sample 1, except that undercoating layer paste A3 was used instead of the undercoating layer paste A1, the membrane electrode assembly MEA of Sample 3 was prepared in the same way as in Sample 1. The undercoating layer paste A3 was prepared by mixing 12 g of teflon (trademark) powder (trade name: L170J, produced by ASAHI GLASS Co., Ltd.) and 39 g of Pt—Ru supporting carbon particles (trade name: TEC61E54, Pt:Ru=1:1, catalyst supporting material: Ketchenblack EC, produced by TANAKA PRCIOUS METALS) with ethylene glycol.

Sample 4

Using the producing process of the anode diffusion layer of Sample 1, except that undercoating layer paste A4 was used instead of the undercoating layer paste A1, the membrane electrode assembly MEA of Sample 4 was prepared in the same way as in Sample 1. The undercoating layer paste A4 was prepared by mixing 15 g of teflon (trademark) powder (trade name: L170J, produced by ASAHI GLASS Co., Ltd.) and 32.6 g of Pt—Ru supporting carbon particles (trade name: TEC61E54, Pt:Ru=1:1, catalyst supporting material: Ketchenblack EC, produced by TANAKA PRECIOUS METALS) with ethylene glycol.

Sample 5

Using the producing process of the anode diffusion layer of Sample 1, except that undercoating layer paste A5 was used instead of the undercoating layer paste A1, the membrane electrode assembly MEA of Sample 5 was prepared in the same way as in Sample 1. The undercoating layer paste A5 was prepared by mixing 18 g of teflon (trademark) powder (trade name: L170J, produced by ASAHI GLASS Co., Ltd.) and 26 g of Pt—Ru supporting carbon particles (trade name: TEC61E54, Pt:Ru=1:1, catalyst supporting material: Ketchenblack EC, produced by TANAKA PRECIOUS METALS) with ethylene glycol.

Sample 6

Using the producing process of the anode diffusion layer of Sample 1, except that undercoating layer paste A6 was used instead of the undercoating layer paste A1, the membrane electrode assembly MEA of Sample 6 was prepared in the same way as in Sample 1. The undercoating layer paste A6 was prepared by mixing 21 g of teflon (trademark) powder (trade name: L170J, produced by ASAHI GLASS Co., Ltd.) and 19.5 g of Pt—Ru supporting carbon particles (trade name: TEC61E54, Pt:Ru=1:1, catalyst supporting material: Ketchenblack EC, produced by TANAKA PRECIOUS METALS) with ethylene glycol.

Sample 7

Using the producing process of the anode diffusion layer of Sample 1, except that undercoating layer paste A7 was used instead of the undercoating layer paste A1, the membrane electrode assembly MEA of Sample 7 was prepared in the same way as in Sample 1. The undercoating layer paste A7 was prepared by mixing 24 g of teflon (trademark) powder (trade name: L170J, produced by ASAHI GLASS Co., Ltd.) and 13 g of Pt—Ru supporting carbon particles (trade name: TEC61E54, Pt:Ru=1:1, catalyst supporting material: Ketchen black EC, produced by TANAKA PRECIOUS METALS) with ethylene glycol.

Sample 8

Using the producing process of the anode diffusion layer of Sample 1, except that undercoating layer paste B1 was used instead of the undercoating layer paste A1 and that alloy catalyst containing ruthenium was not added to the anode diffusion layer, the membrane electrode assembly MEA of Sample 8 was prepared in the same way as in Sample 1.

Sample 9

Using the producing process of the anode diffusion layer of Sample 1, except that undercoating layer paste A8 was used instead of the undercoating layer paste A1, and that the amount of water absorbed in the catalyst supporting carbon particles was changed, the membrane electrode assembly MEA of Sample 9 was prepared in the same way as in Sample 1. The undercoating layer paste A8 was prepared by mixing 12 g of teflon (trademark) powder (trade name: L170J, produced by ASAHI GLASS Co., Ltd.) and 39 g of Pt—Ru supporting carbon particles (trade name: TEC61V33, Pt:Ru=1:1, catalyst supporting material: VulcanXC-75, produced by TANAKA PRECIOUS METALS) with ethylene glycol.

Sample 10

Using the producing process of the anode diffusion layer of Sample 1, except that undercoating layer paste A9 was used instead of the undercoating layer paste A1, and that the amount of water absorbed in the catalyst supporting carbon particles was changed, the membrane electrode assembly MEA of Sample 10 was prepared in the same way as in Sample 1. The undercoating layer paste A9 was prepared by arranging catalyst having a ratio of Pt:Ru=1:1.5 on carbon powder (trade name: Denkablack, produced by DENKI KAGAKU KOGYO K.K.) at 40% by an impregnation method, and then mixing 12 g of teflon (trademark) powder (trade name: L170J, produced by ASAHI GLASS Co., Ltd.) and 30 g of the above-mentioned catalyst supporting carbon with ethylene glycol.

2. Fuel Shortage Test

A fuel shortage test was performed to a fuel cell in which the above-mentioned membrane electrode assembly was placed in conditions of a cell temperature of 80° C., humidities at the anode of 45 RH% and at the cathode of 85 RH%, a utilization ratio at 0.5 A/cm$^2$ at the anode of 110% and at the cathode of 60% while maintaining a current density of 1 A/cm$^2$ for 20 minutes. Voltage differences calculated by measuring terminal voltages before and after the fuel shortage tests are shown in Tables 1 and 2. Each terminal voltage was measured under conditions of a cell temperature of 80° C., humidities at the anode of 45 RH% and at the cathode of 85 RH%, a utilization ratio at 0.5 A/cm$^2$ at the anode of 60% and at the cathode of 60%. The terminal voltage at the beginning of the tests was −4.0 V.

TABLE 1

| | Weight of water repellent resin to Weight of catalyst supporting carbon particle | Deterioration of voltage (mV) |
|---|---|---|
| Sample 1 | 1:9 | 59 |
| Sample 2 | 3:7 | 48 |
| Sample 3 | 4:6 | 44 |
| Sample 4 | 5:5 | 45 |
| Sample 5 | 6:4 | 48 |
| Sample 6 | 7:3 | 49 |
| Sample 7 | 8:2 | 77 |
| Sample 8 | Ru not contained | 260 |

TABLE 2

| | Amount of water absorbed by catalyst supporting carbon particles (cc/g) | Reduction in voltage (mV) |
|---|---|---|
| Sample 3 | 370 | 44 |
| Sample 9 | 80 | 157 |
| Sample 10 | 130 | 56 |

3. Evaluation (1) Deposited Condition of Ru Component

Figure 2:
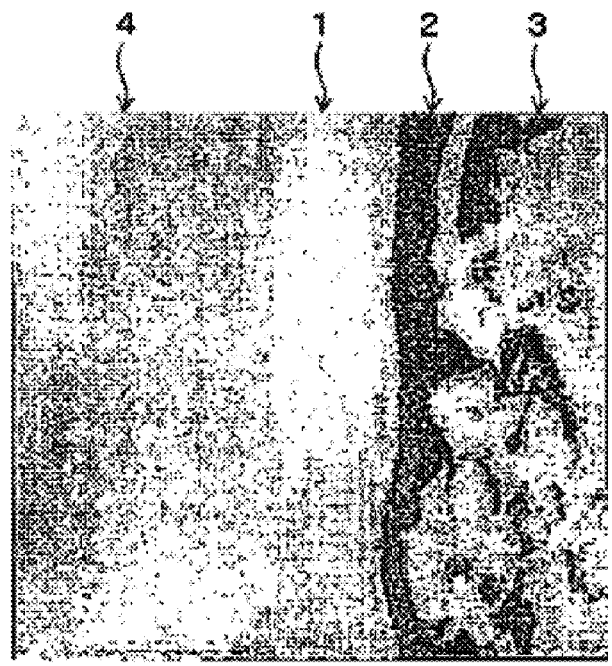
FIG. 2 is an electron microgram showing Ru around a cross section of the membrane electrode assembly in a Comparative Example of the present invention.

FIG. 1 is an electron micrograph showing the Ru at a cross section of the membrane electrode assembly of Sample 4, which is an Example of the present invention. On the other hand, FIG. 2 is an electron micrograph showing the Ru at a cross section of the membrane electrode assembly of Sample 8, which is a Comparative Example. As is clear from FIGS. 1 and 2, the Ru component was eluted from the anode catalytic layer 2 to the anode diffusion layer 3 and was deposited as Ru oxide in the case of Sample 8 in which an alloy catalyst containing Ru was not added to the anode diffusion layer; on the other hand, deposition of Ru oxide was not observed in the anode diffusion layer 3 in the case of Sample 1 in which an alloy catalyst containing Ru was added to the anode diffusion layer 3. That is, in the present invention, by adding the alloy catalyst containing Ru to the anode diffusion layer 3, elution of the Ru component from the anode catalyst layer 2 to the anode diffusion layer 3 and deposition of Ru can be reduced.

Figure 3:
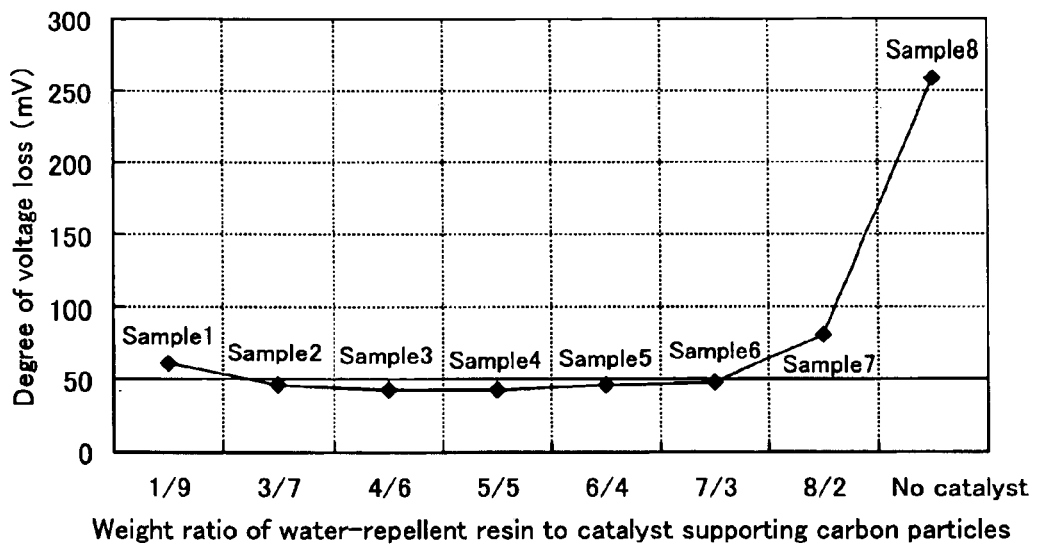
FIG. 3 is a graph showing the relationship of the weight of the water-repellent resin to the weight of the catalyst supporting carbon particles and the degree to which the voltage is reduced.

(2) Weight Ratio of Water Repellent Resin to Catalyst Supporting Carbon Particle FIG. 3 is a graph showing the relationship of the weight ratio of water repellent resin to catalyst supporting carbon particle of Samples 1 to 8 and degree to which voltage was reduced. As is clear from FIG. 3, voltage deterioration in Samples 1 to 7 in which the alloy catalyst containing Ru was added to the anode diffusion layer was small compared to that of Sample 8 in which the alloy catalyst containing Ru was not added. Therefore, it is clear that the present invention can minimize the loss of efficiency of the fuel cell. Furthermore, comparing Samples 1 to 7, voltage loss can be reduced to be not more than 50 mV as long as the weight ratio of water repellent resin to catalyst supporting carbon particle is maintained within a range of 1:9 to 7:3. The present invention can therefore exhibit superior effects in minimizing efficiency loss.

(3) Amount of Water Absorbed by Catalyst Supporting Carbon Particles

Figure 4:
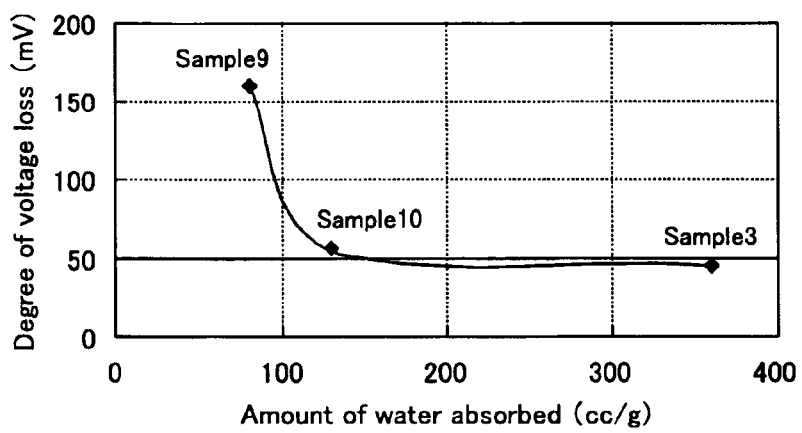
FIG. 4 is a graph showing the relationship of the amount of water absorbed by the catalyst supporting carbon particle and the degree to which the voltage is reduced.

FIG. 4 is a graph showing the relationship of the amount of water absorbed by the catalyst supporting carbon particles of Samples 3, 9, and 10 shown in Table 2 and the voltage loss. As is clear from FIG. 4, voltage loss can be minimized to be not more than 50 mV as long as the amount of water absorbed by the catalyst supporting carbon particle is maintained to be not less than 150 cc/g. The present invention can therefore exhibit superior effects in minimizing efficiency loss.

As is explained above, in the present invention, by adding the alloy catalyst containing Ru to the anode diffusion layer, the added alloy catalyst containing Ru acts as a core, the Ru component which is eluted from the anode catalytic layer is deposited around the core (the alloy catalyst containing Ru) and is trapped. As a result, deposition of the Ru component in a gas passage of the anode diffusion layer can be prevented and loss of power generating efficiency due to the deposition of the Ru component during the operation at high potential can also be minimized.

What is claimed is:

1. A membrane electrode assembly for an electrolyte fuel cell, the assembly comprising:

a polymer electrolyte membrane, an anode and a cathode having a catalytic layer and a diffusion layer, and an alloy catalyst containing ruthenium in the anode diffusion layer.

2. The membrane electrode assembly for an electrolyte fuel cell according to claim 1, wherein the alloy catalyst containing Ru is supported on carbon particles, the carbon particles are used mixed with a water repellent resin, and the water repellent resin and the catalyst supporting carbon particles have a weight ratio in a range from 1:9 to 7:3.

3. The membrane electrode assembly for an electrolyte fuel cell according to claim 2, wherein the amount of water absorbed by the carbon particles under a saturated water vapor pressure at 60° C. is not less than 150 cc/g.

* * * * *